(12) United States Patent
Li et al.

(10) Patent No.: US 10,547,074 B2
(45) Date of Patent: Jan. 28, 2020

(54) ANIONIC SCAVENGER MATERIALS IN ANODE/CATHODE LOOP OF FUEL CELL SYSTEM

(71) Applicant: GM GLOBAL TECHNOLOGY OPERATIONS LLC, Detroit, MI (US)

(72) Inventors: Qiang Li, Troy, MI (US); Paul Taichiang Yu, Pittsford, NY (US); Jingxin Zhang, Novi, MI (US); Balasubramanian Lakshmanan, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 194 days.

(21) Appl. No.: 15/286,186

(22) Filed: Oct. 5, 2016

(65) Prior Publication Data

US 2017/0117565 A1 Apr. 27, 2017

Related U.S. Application Data

(60) Provisional application No. 62/246,254, filed on Oct. 26, 2015.

(51) Int. Cl.
| | | |
|---|---|---|
| H01M 8/04 | (2016.01) | |
| H01M 8/06 | (2016.01) | |
| H01M 8/0662 | (2016.01) | |
| H01M 8/2457 | (2016.01) | |
| H01M 8/1007 | (2016.01) | |
| H01M 8/04089 | (2016.01) | |
| H01M 8/1004 | (2016.01) | |
| H01M 8/1039 | (2016.01) | |
| H01M 8/241 | (2016.01) | |
| H01M 8/1018 | (2016.01) | |

(52) U.S. Cl.
CPC ...... *H01M 8/0687* (2013.01); *H01M 8/04097* (2013.01); *H01M 8/1004* (2013.01); *H01M 8/1007* (2016.02); *H01M 8/1039* (2013.01); *H01M 8/241* (2013.01); *H01M 8/2457* (2016.02); *H01M 2008/1095* (2013.01); *H01M 2250/20* (2013.01); *H01M 2300/0082* (2013.01)

(58) Field of Classification Search
CPC ............. H01M 8/0687; H01M 8/2457; H01M 8/04097; H01M 8/04141
See application file for complete search history.

(56) References Cited

U.S. PATENT DOCUMENTS

| | | | | |
|---|---|---|---|---|
| 2005/0196654 | A1* | 9/2005 | Inai | ........... H01M 8/04126 429/413 |
| 2010/0239927 | A1* | 9/2010 | Moran | ........... H01M 8/04097 429/429 |
| 2014/0251819 | A1* | 9/2014 | Logan | ........... C25B 1/02 205/344 |

FOREIGN PATENT DOCUMENTS

CN  102362383 A  2/2012

* cited by examiner

*Primary Examiner* — Ula C Ruddock
*Assistant Examiner* — Frank A Chernow
(74) *Attorney, Agent, or Firm* — Reising Ethington P.C.

(57) ABSTRACT

A fuel cell system that includes a component for removing anionic contaminants is provided. The fuel system including a fuel cell stack, a fuel gas feed subsystem in communication with fuel cell anodes in the fuel cell stack, an oxygen-containing gas feed subsystem system in communication with fuel cell cathodes in the fuel cell stack, and an anionic scavenging subsystem in communication with the fuel gas feed subsystem and/or the an oxygen-containing gas feed subsystem.

15 Claims, 4 Drawing Sheets

ANIONIC SCAVENGER MATERIALS IN ANODE/CATHODE LOOP OF FUEL CELL SYSTEM

CROSS-REFERENCE TO RELATED APPLICATIONS

This application claims the benefit of U.S. provisional application Ser. No. 62/246,254 filed Oct. 26, 2015, the disclosure of which is hereby incorporated in its entirety by reference herein.

TECHNICAL FIELD

In at least one embodiment, the present invention is related to methods and systems for recovery voltage loss in a fuel cell resulting from anion contamination.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

Although the prior art fuel cell systems work reasonably well, it is known that sulfate can be released due to chemical degradation of the perfluorosulfonic acid (PFSA) type of PEM membrane. In addition, $SO_2$ from air can be dissolved in water and changed to sulfite and sulfate. Sulfate which has shown strong correlation to cell voltage loss is released into product water during the recovery cycle. Those sulfate will be bound to the anion exchange material in the anode/cathode loop, thus will not be recycled back to the cell and cause fast voltage loss. Currently, a running recovery procedure is the only effective method to solve the problem of reversible degradation loss. However, sulfate and other anions which cause electrode contamination may not be removed out from the system completely during the recovery cycle.

Accordingly, there is a need for improved methods and system for preventing fuel cell voltage loss from anionic contaminants.

SUMMARY

The present invention solves one or more problems of the prior art by providing in at least one embodiment, a fuel cell system that includes a component for removing anionic contaminants. The fuel system including a fuel cell stack, a fuel gas feed subsystem in communication with fuel cell anodes in the fuel cell stack, an oxygen-containing gas feed subsystem in communication with fuel cell cathodes in the fuel cell stack, and an anionic scavenging subsystem in communication with the fuel gas feed subsystem and/or the an oxygen-containing gas feed subsystem. The fuel gas feed subsystem provides fuel to the fuel cell anodes while the oxygen-containing gas feed subsystem provides oxygen-containing gas to the fuel cell anodes. Fuel cells in the fuel cell stack release sulfate via membrane degradation which can be released into the anode/cathode loops and may be recycled back to the cell and thereby causing further voltage loss. Advantageously, the anionic scavenging subsystem removes the sulfate and other contaminants (e.g. chloride) from the anode or cathode recycle loops.

In another embodiment, a fuel cell system that removes anionic contaminants is provided. The fuel system including a fuel cell stack, a fuel gas feed subsystem in communication with fuel cell anodes in the fuel cell stack, an oxygen-containing gas feed subsystem in communication with fuel cell cathodes in the fuel cell stack, a first anionic scavenging subsystem in fluid communication with the fuel gas feed subsystem, and second anionic scavenging subsystem in fluid communication with the an oxygen-containing gas feed subsystem. The fuel gas feed subsystem provides fuel to the fuel cell anodes. The fuel gas feed subsystem also includes an anode loop in which the fuel gas is recycled and combined with fresh fuel at a fuel recombination station. Similarly, the oxygen-containing gas feed subsystem provides oxygen-containing gas to the fuel cell cathode. The oxygen-containing gas feed subsystem also includes a cathode loop in which the water is transferred from the outlet to the incoming dry cathode oxygen-containing feed gas by a humidifier. The first anionic scavenging subsystem is positioned between an anode exhaust and the fuel recombination station while the second anionic scavenging subsystem is positioned between a cathode exhaust and the fuel recombination station.

DETAILED DESCRIPTION

Figure 1:
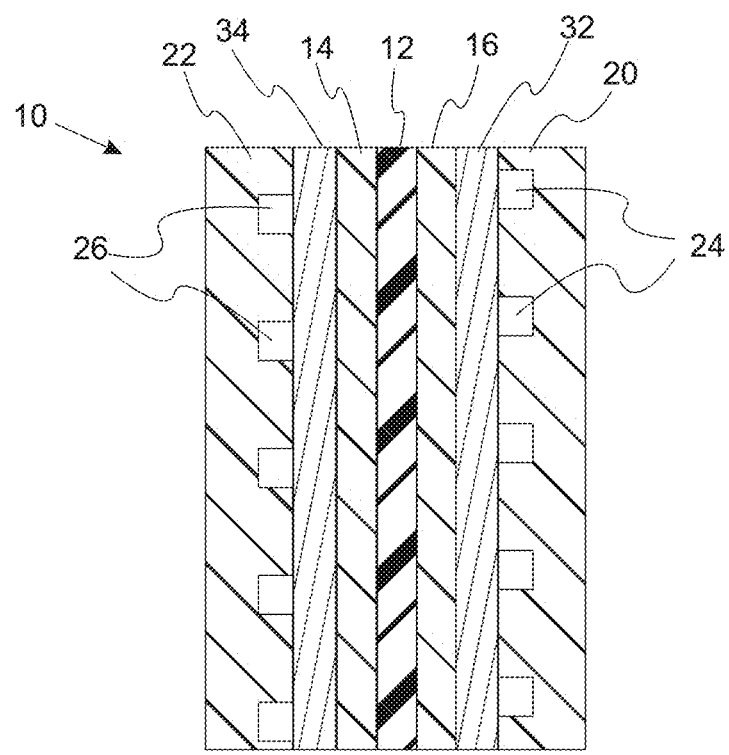
FIG. 1 is a schematic cross section of a fuel cell that incorporates carbon supported catalysts into the anode and/or cathode catalyst layers.

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description and does not necessarily preclude chemical interactions among the constituents of a mixture once mixed; the first definition of an acronym or other abbreviation applies to all subsequent uses herein of the same abbreviation and applies *mutatis mutandis* to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It must also be noted that, as used in the specification and the appended claims, the singular form "a," "an," and "the" comprise plural referents unless the context clearly indicates otherwise. For example, reference to a component in the singular is intended to comprise a plurality of components.

Abbreviations:

"RT" means room temperature."

Throughout this application, where publications are referenced, the disclosures of these publications in their entireties are hereby incorporated by reference into this application to more fully describe the state of the art to which this invention pertains.

FIG. 1 provides a cross-sectional view of a fuel cell that can be incorporated into a fuel cell system in which anionic contaminates are removed. PEM fuel cell 10 includes polymeric ion conducting membrane 12 disposed between cathode electro-catalyst layer 14 and anode electro-catalyst layer 16. Fuel cell 10 also includes electrically conductive flow field plates 20, 22 which include gas channels 24 and 26. Flow field plates 20, 22 are either bipolar plates (illustrated) or unipolar plates (i.e., end plates). In a refinement, flow field plates 20, 22 are formed from a metal plate (e.g., stainless steel) optionally coated with a precious metal such as gold or platinum. In another refinement, flow field plates 20, 22 are formed from conducting polymers which also are optionally coated with a precious metal. Gas diffusion layers 32 and 34 are also interposed between flow field plates and a catalyst layer. During operation, hydrogen is supplied to the anode catalyst layer 16 as fuel and oxygen is supplied to the cathode catalyst layer 14 as the oxidant, thereby producing electricity as the result of the electrochemical process therein. However, one complication of fuel cell operation is the degradation of the polymeric ion conducting membrane that may release sulfate. In addition, $SO_2$ from air can be dissolved in water and changed to sulfite and sulfate. For examples, Table 1 shows the fuel cell voltage (V1) at first time and the fuel cell voltage (V2) at a later time after exposing to ppb levels of $SO_2$ in air. This table shows the effects $SO_2$ from ambient air for cell being operated at 0.2 $A/cm^2$:

TABLE 1

| Conc. [ppb] | V1 [mV] | V2 [mV] | ΔV [mV] |
|---|---|---|---|
| 0 | 800 | 789 | 11 |
| 50 | 792 | 773 | 19 |
| 200 | 790 | 765 | 25 |

Figure 2:
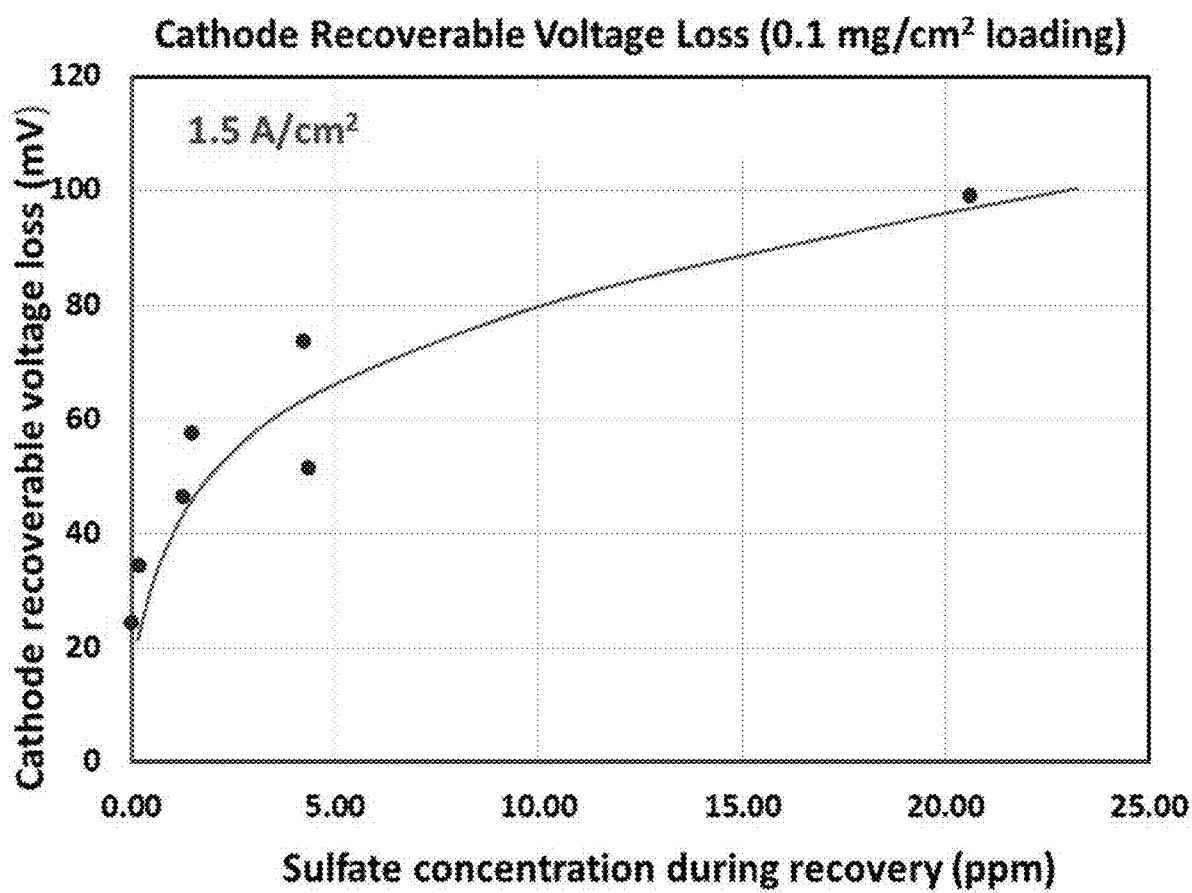
FIG. 2 is a plot showing the correlation of recoverable voltage loss and sulfate concentration in a fuel cell cathode exhaust water.
Figure 3:
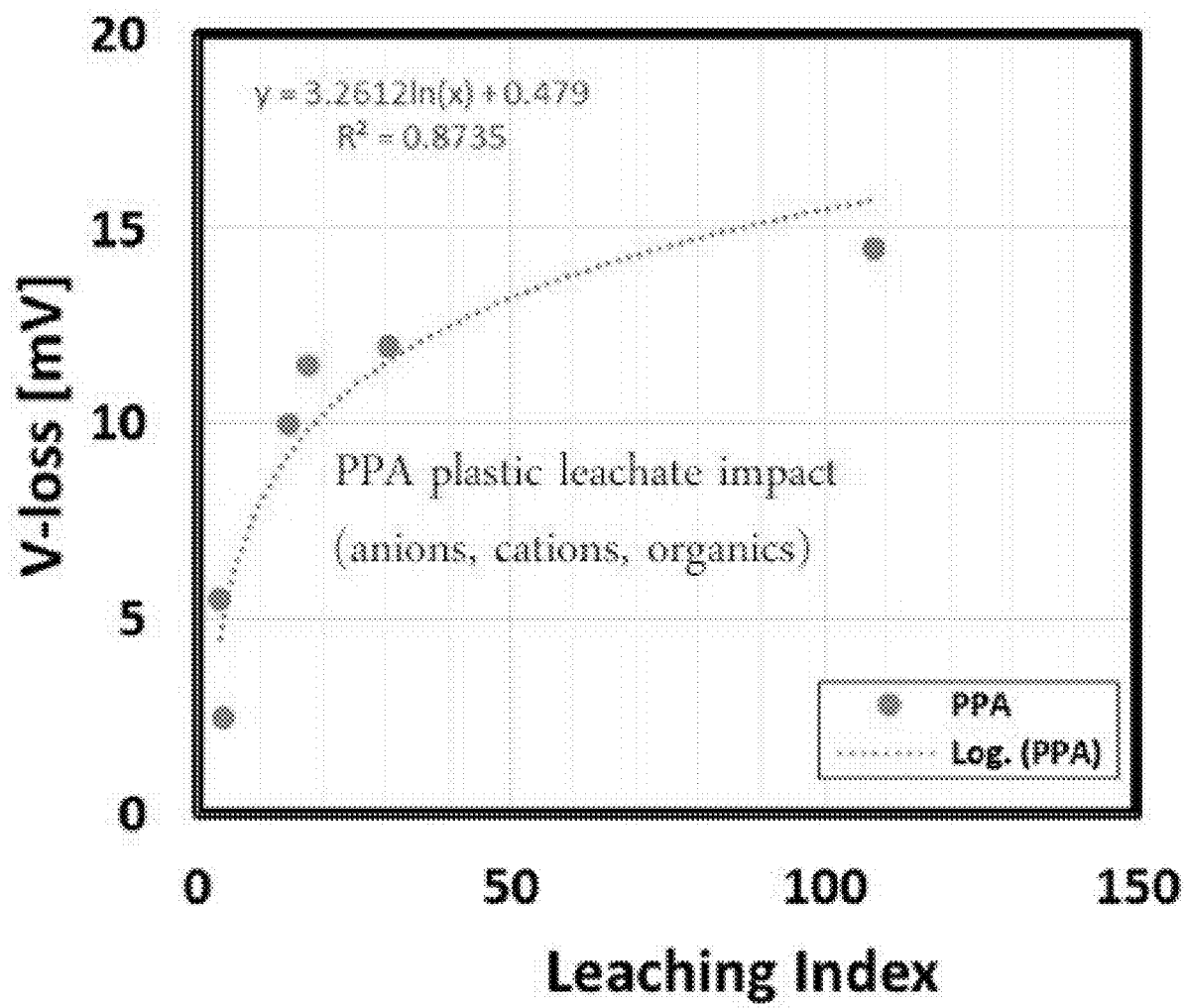
FIG. 3 provides a plot of the correlation of cell voltage loss and BOP material leaching index.

FIG. 2 provides a plot showing the correlation of recoverable voltage loss and sulfate concentration in a fuel cell cathode exhaust water. Similarly, FIG. 3 provides a plot of the correlation of cell voltage loss and BOP material leaching index. The deleterious effects of sulfate on fuel cell performance are clearly undeniable.

Figure 4:
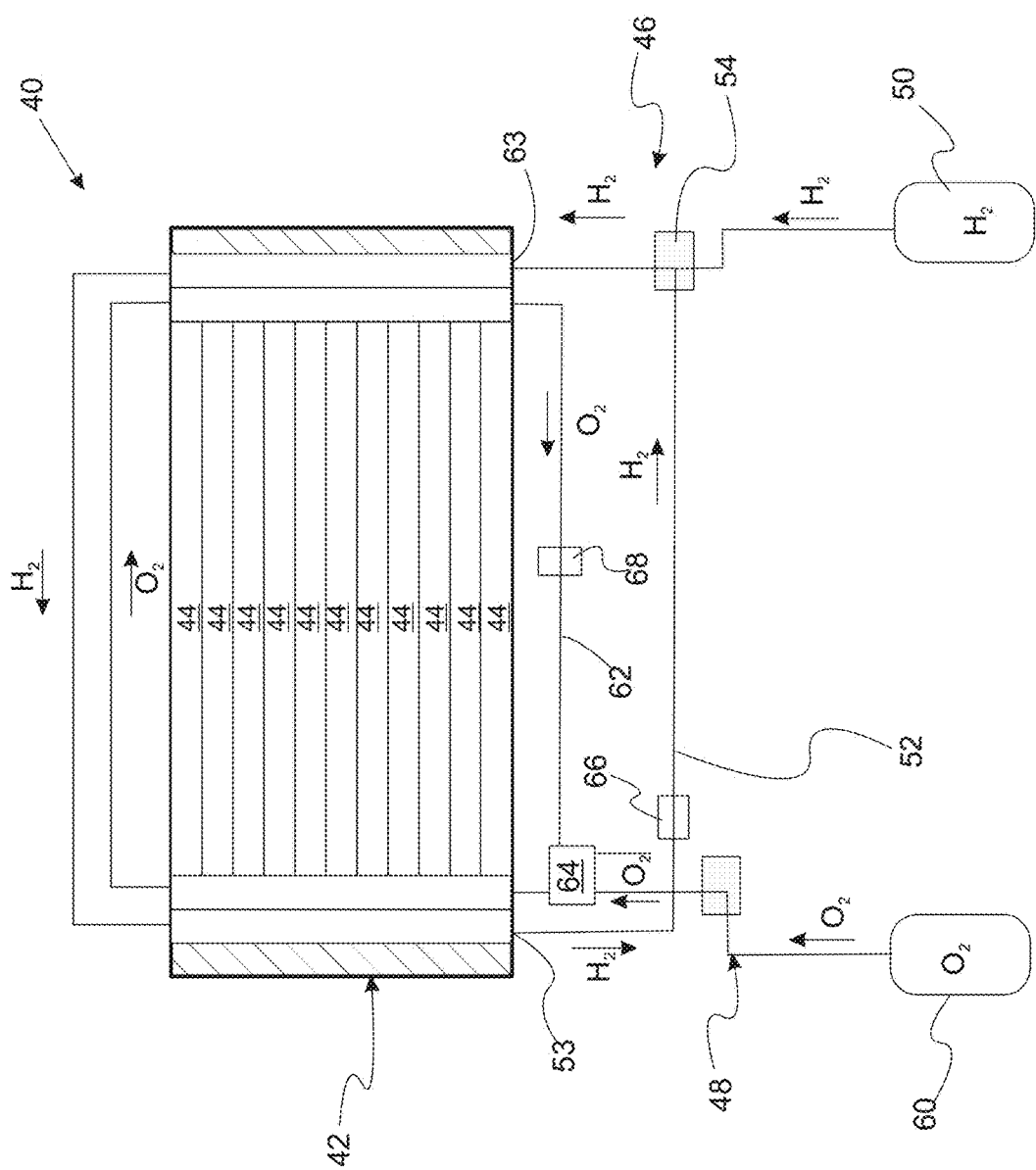
FIG. 4 provides a schematic illustration of a fuel cell system that removed anionic contaminants is provided.

With reference to FIG. 4, a schematic illustration of a fuel cell system that removes anionic contaminants is provided. Fuel cell system 40 includes fuel cell stack 42 which includes one or more individual fuel cells 44. In a refinement, fuel cells 44 are of the general design depicted in FIG. 1 and it associated description. In one refinement, fuel cell stack 42 includes from 5 to 400 fuel cells. Fuel cell system 40 also includes a fuel gas feed subsystem 46 in communication with fuel cell anodes in the fuel cell stack 42 and an oxygen-containing gas feed subsystem 48 in communication with fuel cell cathodes in the fuel cell stack 42.

Still referring to FIG. 4, fuel gas feed subsystem 46 includes fuel source 50 which provides a fuel-containing gas to fuel cell stack 42 and in particular, to the fuel cell anodes. Typically, the fuel includes molecular hydrogen. The fuel enters the fuel cell stack and contacts the fuel cell anodes and in particular, the anode catalyst layers of the fuel cells. In some variations, fuel gas feed subsystem 46 includes anode loop 52 in which the fuel is recycled from anode exhaust 53 and combined with fresh fuel at fuel recombination station 54. In this context, anode loop 52 includes the entire flow path from recombination station 54 through the fuel cell stack and back to fuel recombination station 54.

Still referring to FIG. 4, oxygen-containing gas feed subsystem 48 includes oxygen-containing gas source 60 which provides an oxygen-containing gas to fuel cell stack 42. Typically, the oxygen-containing gas includes molecular oxygen (e.g., air). The oxygen-containing gas enters the fuel cell stack and contacts the fuel cell cathodes and in particular, the cathode catalyst layers of the fuel cells. In some variations, oxygen-containing gas feed subsystem 48 includes cathode loop 62 in which the water is transferred from cathode exhaust 63 of the fuel cell cathodes to the incoming dry cathode oxygen-containing feed gas (e.g., air) via humidifier 64. In this context, cathode loop 62 includes the entire flow path from humidifier 64 through the fuel cell stack and back to humidifier 64.

Still referring to FIG. 4, fuel cell system 40 includes anionic scavenging subsystems 66 and/or 68 which in communication with the fuel gas feed subsystem 46 and/or oxygen-containing gas feed subsystem 48. In some variations, fuel cell system 40 includes one or both of anionic scavenging subsystems 66 and/or 68. Anionic scavenging subsystems 66 and 68 remove the sulfate and optionally other contaminants from the anode or cathode recycle loops. Anionic scavenging subsystem 66 is positioned in the anode recycle loop 52 between anode exhaust 53 and recombination station 54. Similarly, anionic scavenging subsystem 68 is positioned in the cathode loop 62 between cathode exhaust 63 and humidifier 64. Humidifier 64 transfers water formed on the wet output cathode gas of the fuel cell to the dry incoming oxygen-containing gas in order to humidify that gas. Therefore, the humidifier provides a path for anionic contaminants to pass from the cathode outlet back to cathode inlet of a fuel cell stack. In a refinement, anionic scavenging subsystem 66 is positioned between the cathode outlet and humidifier 64 thereby reducing the amount of anionic contaminants that are passed back to the oxygen-containing gas. In a refinement, the anionic scavenging subsystems 66 and 68 each independently remove at least 80 weight percent of the anionic contaminants in the fuel gas and oxygen-containing gas, respectively. In another refinement, the anionic scavenging subsystems 66 and 68 each independently remove at least 90 weight percent of the anionic contaminants in the fuel gas and oxygen-containing gas, respectively. In still another refinement, the anionic scavenging subsystems 66 and 68 each independently remove from 80 to 100 weight percent of the anionic contaminants in the fuel gas and oxygen-containing gas, respectively. In still another refinement, the anionic scavenging subsystems 66 and 68 each independently remove from 90 to 98 weight percent of the anionic contaminants in the fuel gas and oxygen-containing gas, respectively. For these weight percentages, the weight percent is the weight of the gas flowing into the scavenging subsystems.

In a variation, anionic scavenging subsystem 66 and 68 includes anion exchange resins or ionomers (common functional group: quaternary ammonium) in the hydroxide (OH⁻) form. It should be appreciated that resins can be washed to remove any contamination before use. Moreover, the resins can be regenerated or replaced during service.

Tables 2 and 6 provide measured anion removal percentages at equilibrium for a test anion exchange resin which was Amberlyst® A26 in the hydroxide form.

TABLE 2

| | Fluoride (mg/L) | Sulfate (mg/L) | Percent Removal of Fluoride (%) | Percent Removal of Sulfate (%) |
|---|---|---|---|---|
| Initial F/SO₄ Solution | 273.3 | 7.6 | | |
| RT Stir | 199.4 | 0.0 | 27.1% | 100.0% |
| RT No Stir | 196.3 | 0.1 | 28.2% | 98.9% |
| 55° C. No Stir | 182.0 | 0.0 | 33.4% | 100.0% |
| 80° C. No Stir | 204.3 | 0.0 | 25.2% | 100.0% |

TABLE 3

| | Fluoride (mg/L) | Sulfate (mg/L) | Percent Removal of Fluoride (%) | Percent Removal of Sulfate (%) | Separation Factor(α SO₄/F) |
|---|---|---|---|---|---|
| Initial F/SO₄ Solution #1 | 1088.1 | 40.0 | | | |
| RT | 1077.9 | 24.6 | 0.94% | 38.32% | 65.7 |
| 55° C. | 1081.0 | 26.3 | 0.65% | 34.12% | 78.9 |
| 80° C. | 1079.1 | 25.0 | 0.83% | 37.33% | 71.4 |
| Initial F/SO₄ Solution #2 | 2278.3 | 81.9 | | | |
| RT | 2267.3 | 66.7 | 0.48% | 18.51% | 46.8 |
| 55° C. | 2264.4 | 67.2 | 0.61% | 17.88% | 35.5 |
| 80° C. | 2268.0 | 65.5 | 0.45% | 20.07% | 55.3 |

It is observed that when there is excessive competition of anions in solution, the anion exchange resin has high selectivity for sulfate. Moreover, no significant difference was observed in anion removal ability under different conditions of temperature over three days.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell system that removes anionic contaminants, the fuel cell system comprising:
   a fuel cell stack that includes fuel cell anodes and fuel cell cathodes;
   a fuel gas feed subsystem in communication with the fuel cell anodes in the fuel cell stack, the fuel gas feed subsystem providing fuel gas to the fuel cell anodes and further including an anode loop in which fuel gas exhausted from the fuel cell anodes is collected and combined with fresh fuel gas at a recombination station to produce the fuel gas that is provided to the fuel cell anodes;
   an oxygen-containing gas feed subsystem in communication with the fuel cell cathodes in the fuel cell stack, the oxygen-containing gas feed subsystem providing oxygen-containing gas to the fuel cell anodes and further including a cathode loop in which oxygen-containing gas exhausted from the fuel cell cathodes is passed through a humidifier to transfer water to incoming dry oxygen-containing gas to produce the oxygen-containing gas that is provided to the fuel cell cathodes; and an anionic scavenging subsystem in communication with the fuel gas feed subsystem and/or the oxygen-containing gas feed subsystem, the anionic scavenging subsystem comprising an anion exchange resin or ionomer that removes sulfates from the fuel gas exhausted from the fuel cell anodes and/or the oxygen-containing gas exhausted from the fuel cell cathodes.

2. The fuel cell system of claim 1 wherein the anion exchange resins or ionomers are in a hydroxide form.

3. The fuel cell system of claim 1 wherein the anion exchange resins or ionomers include quaternary ammonium groups.

4. The fuel cell system of claim 1 wherein the anionic scavenging subsystem is positioned between an anode exhaust where fuel gas is exhausted from the fuel cell anodes and the fuel recombination station.

5. The fuel cell system of claim 1 wherein the anionic scavenging subsystem is positioned between a cathode exhaust where oxygen-containing gas is exhausted form the fuel cell cathodes and the humidifier.

6. The fuel cell system of claim 1 wherein the fuel gas is molecular hydrogen.

7. The fuel cell system of claim 1 wherein the oxygen-containing gas is molecular oxygen.

8. The fuel cell system of claim 1 wherein the anionic scavenging subsystem removes at least 80 weight percent of the sulfates in the fuel gas exhausted from the fuel cell anodes and/or the oxygen-containing gas exhausted from the fuel cell cathodes.

9. A fuel cell system that removes anionic contaminants, the fuel cell system comprising:

a fuel cell stack that includes fuel cell anodes and fuel cell cathodes;

a fuel gas feed subsystem that provides fuel gas to the fuel cell anodes and includes an anode loop in which fuel gas exhausted from an anode exhaust of the fuel cell stack is recycled and combined with fresh fuel was at a fuel recombination station;

an oxygen-containing gas feed subsystem that provides oxygen-containing gas to the fuel cell cathodes and includes a cathode loop in which water is transferred from oxygen-containing gas exhausted from a cathode exhaust of the fuel cells stack to incoming dry oxygen-containing gas by a humidifier; and a first anionic scavenging subsystem positioned between the anode exhaust of the fuel cell stack and the fuel recombination station to thereby remove anionic contaminants from the fuel gas exhausted from the anode exhaust before the fuel gas exhausted from the anode exhaust of the fuel cell stack is combined with fresh fuel gas at the fuel recombination station; and a second anionic scavenging subsystem positioned between the cathode exhaust of the fuel cell stack and the humidifier to thereby remove anionic contaminants from the oxygen-containing gas exhausted from the cathode exhaust of the fuel cell stack before water is transferred from the oxygen-containing gas exhausted from the cathode exhaust of the fuel cell stack to the incoming dry oxygen-containing gas at the humidifier.

10. The fuel cell system of claim 9 wherein the first anionic scavenging subsystem and the second anionic scavenging subsystem each independently include anion exchange resins or ionomers.

11. The fuel cell system of claim 10 wherein the anion exchange resins or ionomers are in a hydroxide form.

12. The fuel cell system of claim 10 wherein the anion exchange resins or ionomers include quaternary ammonium groups.

13. The fuel cell system of claim 10 wherein the fuel gas is molecular hydrogen.

14. The fuel cell system of claim 10 wherein the oxygen-containing gas is molecular oxygen.

15. The fuel cell system of claim 10 wherein the first anionic scavenging subsystem and the second anionic scavenging subsystem each independently remove at least 80 weight percent of the anionic contaminants in the fuel gas exhausted from the fuel cell anodes and the oxygen-containing gas exhausted from the fuel cell cathodes, respectively.

* * * * *